US010065479B1

(12) United States Patent
Stander et al.

(10) Patent No.: US 10,065,479 B1
(45) Date of Patent: Sep. 4, 2018

(54) SYSTEM AND METHOD FOR MINIMIZING AIR LEAK IN AN HVAC UNIT

(71) Applicant: DENSO International America, Inc., Southfield, MI (US)

(72) Inventors: James Stander, West Bloomfield, MI (US); Reilly Patrick Mullett, Livonia, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/439,462

(22) Filed: Feb. 22, 2017

(51) Int. Cl.
*F25D 17/04* (2006.01)
*B60H 1/00* (2006.01)

(52) U.S. Cl.
CPC ..... *B60H 1/00978* (2013.01); *B60H 1/00464* (2013.01); *B60H 1/00521* (2013.01); *B60H 1/00564* (2013.01); *B60H 1/00864* (2013.01)

(58) Field of Classification Search
CPC ............ B60H 1/00564; B60H 1/00464; B60H 1/00864; B60H 1/00521
USPC ......................................... 62/408
See application file for complete search history.

(56) References Cited

U.S. PATENT DOCUMENTS

| | | | |
|---|---|---|---|
| 4,586,652 A | 5/1986 | Sakurai | |
| 5,699,960 A | 12/1997 | Kato et al. | |
| 6,311,763 B1 * | 11/2001 | Uemura | B60H 1/00664 165/43 |
| 6,655,163 B1 | 12/2003 | Scherer et al. | |
| 7,540,322 B2 | 6/2009 | Kang et al. | |
| 8,267,155 B2 * | 9/2012 | Katsuki | B60H 1/00064 165/41 |
| 8,267,165 B2 | 9/2012 | Nanaumi et al. | |
| 8,376,037 B2 | 2/2013 | Nanaumi et al. | |
| 8,397,795 B2 | 3/2013 | Seto | |
| 8,408,980 B2 * | 4/2013 | Nanaumi | B60H 1/00564 454/121 |
| 8,443,872 B2 | 5/2013 | Seto | |
| 8,689,860 B2 | 4/2014 | Seto et al. | |
| 8,997,837 B2 | 4/2015 | Kakizaki et al. | |
| 2010/0248604 A1 * | 9/2010 | Kanemaru | B60H 1/00064 454/75 |
| 2010/0273411 A1 * | 10/2010 | Kakizaki | B60H 1/00064 454/159 |
| 2010/0304654 A1 * | 12/2010 | Kakizaki | B60H 1/00064 454/121 |

(Continued)

*Primary Examiner* — Frantz Jules
*Assistant Examiner* — Steve Tanenbaum
(74) *Attorney, Agent, or Firm* — Harness, Dickey & Pierce, P.L.C.

(57) ABSTRACT

A heating, ventilation, and air condition (HVAC) unit may include a casing, an evaporator, a heater core, and a first damper. The casing may define a front airflow passageway, a rear airflow passageway having an inlet, and first and second outlets in fluid communication with the rear airflow passageway. The evaporator and the heater core may be disposed within the casing. The first damper may be disposed within the casing between the evaporator and the heater core and movable between a first position in which airflow is directed to the heater core and a second position in which airflow is directed away from the heater core. Airflow across the evaporator from the front airflow passageway to the rear airflow passageway is directed to the first and second outlets when the first damper is moved from the first position toward the second position.

10 Claims, 5 Drawing Sheets

(56) References Cited

U.S. PATENT DOCUMENTS

| | | | |
|---|---|---|---|
| 2011/0005710 A1* | 1/2011 | Nanaumi | B60H 1/00064 165/61 |
| 2011/0005713 A1* | 1/2011 | Seto | B60H 1/00028 165/61 |
| 2011/0005717 A1* | 1/2011 | Nanaumi | B60H 1/00064 165/61 |
| 2011/0005732 A1 | 1/2011 | Seto | |
| 2011/0005734 A1 | 1/2011 | Nanaumi et al. | |
| 2011/0073273 A1* | 3/2011 | Seto | B60H 1/00064 165/42 |
| 2011/0073281 A1* | 3/2011 | Seto | B60H 1/00328 165/96 |
| 2011/0088880 A1* | 4/2011 | Seto | B60H 1/00328 165/151 |
| 2012/0214392 A1* | 8/2012 | Kanemaru | B60H 1/00028 454/75 |
| 2013/0283840 A1* | 10/2013 | Kakizaki | B60H 1/00064 62/276 |
| 2016/0046171 A1* | 2/2016 | Xia | B60H 1/00064 165/203 |

* cited by examiner

SYSTEM AND METHOD FOR MINIMIZING AIR LEAK IN AN HVAC UNIT

FIELD

The present disclosure relates to systems and methods for minimizing an air leak in an HVAC unit and, in particular, to systems and methods for minimizing a front to rear air leak in an integrated HVAC unit.

BACKGROUND

This section provides background information related to the present disclosure, which is not necessarily prior art.

HVAC (heating, ventilation, and air conditioning) units provide airflow (heated and/or cooled) to a front region and a rear region of a vehicle cabin, for example. In some instances, airflow may only be desired in the front region of the vehicle cabin, and therefore, airflow to the rear region is terminated. Providing airflow to the front region of the vehicle while terminating airflow to the rear region of the vehicle can cause undesirable air leakage to the vehicle cabin which is discomforting to the vehicle occupants.

The HVAC unit of the present disclosure restricts air leakage into the vehicle cabin, and therefore, avoids vehicle occupant discomfort.

SUMMARY

This section provides a general summary of the disclosure, and is not a comprehensive disclosure of its full scope or all of its features.

In one form, a heating, ventilation, and air conditioning (HVAC) unit includes a casing, an evaporator, a heater core, and a first damper. The casing defines a front airflow passageway, a rear airflow passageway having an inlet, and first and second outlets. The first and second outlets are in fluid communication with the rear airflow passageway. The evaporator is disposed within the casing such that a first section of the evaporator is disposed in the front airflow passageway and a second section of the evaporator is disposed in the rear airflow passageway. The heater core is disposed within the casing such that a first section of the heater core is disposed in the front airflow passageway and a second section of the heater core is disposed in the rear airflow passageway. The first damper is disposed within the casing between the evaporator and the heater core and is moveable between a first position in which airflow is directed to the second section of the heater core and a second position in which airflow is directed away from the second section of the heater core. Airflow across the evaporator from the front airflow passageway to the rear airflow passageway is directed to the first and second outlets when the first damper is moved from the first position toward the second position.

In some configurations, the first damper controls airflow through the rear airflow passageway.

In some configurations, a first blower unit is configured to blow air to the front airflow passageway.

In some configurations, a second blower unit is configured to blow air to the second airflow passageway.

In some configurations, the first blower unit is in an ON mode and a second blower unit is in an OFF mode when the first damper is moved toward the second position and the airflow from the front airflow passageway to the rear airflow passageway is directed toward the first and second outlets.

In some configurations, the first damper reduces the airflow from the front airflow passageway to the rear airflow passageway from flowing to the inlet of the rear airflow passageway.

In some configurations, a second damper is disposed within the casing downstream of the heater core and movable between a first position and a second position.

In some configurations, the second damper is moved to an intermediate position to distribute the airflow from the front airflow passageway to the rear airflow passageway out the first and second outlets.

In another form, a heating, ventilation, and air conditioning (HVAC) unit includes a casing, an evaporator, a heater core, and a first damper. The casing defines a front airflow passageway, a rear airflow passageway having an inlet, and first and second outlets in fluid communication with the rear airflow passageway. The evaporator is disposed within the casing such that a first section of the evaporator is disposed in the front airflow passageway and a second section of the evaporator is disposed in the rear airflow passageway. The heater core is disposed within the casing such that a first section of the heater core is disposed in the front airflow passageway and a second section of the heater core is disposed in the rear airflow passageway. The first damper is disposed within the casing between the evaporator and the heater core and is moveable between a first position in which airflow is directed to the second section of the heater core and a second position in which airflow is directed away from the second section of the heater core. Moving the first damper from the first position toward the second position reduces airflow across the evaporator from the front airflow passageway to the rear airflow passageway from flowing to the inlet of the rear airflow passageway.

In some configurations, the first blower unit is in an ON mode and the second blower unit is in an OFF mode when the first damper reduces the airflow from the front airflow passageway to the rear airflow passageway from flowing to the inlet of the rear airflow passageway.

In some configurations, the airflow from the front airflow passageway to the rear airflow passageway is directed to the first and second outlets when the first damper is moved from the first position toward the second position.

In yet another form, the present disclosure provides a method for reducing air leakage through an inlet of the rear airflow passageway of an HVAC unit. The method includes turning a first blower unit configured to blow air to the front airflow passageway of a casing of the HVAC unit to an ON mode; turning a second blower unit configured to blow air to the rear airflow passageway of the casing of the HVAC unit to an OFF mode; and moving a first damper disposed between an evaporator and a heater core within the casing from a first position toward a second position such that the first damper reduces airflow across the evaporator from the front airflow passageway to the rear airflow passageway from flowing to a first inlet of the rear airflow passageway.

In some configurations, the airflow from the front airflow passageway to the rear airflow passageway is directed to first and second outlets of the rear airflow passageway when the first damper is moved from the first position toward the second position.

In some configurations, the method includes moving a second damper disposed downstream of the heater core to an intermediate position such that the airflow is distributed between the first and second outlets of the rear airflow passageway.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
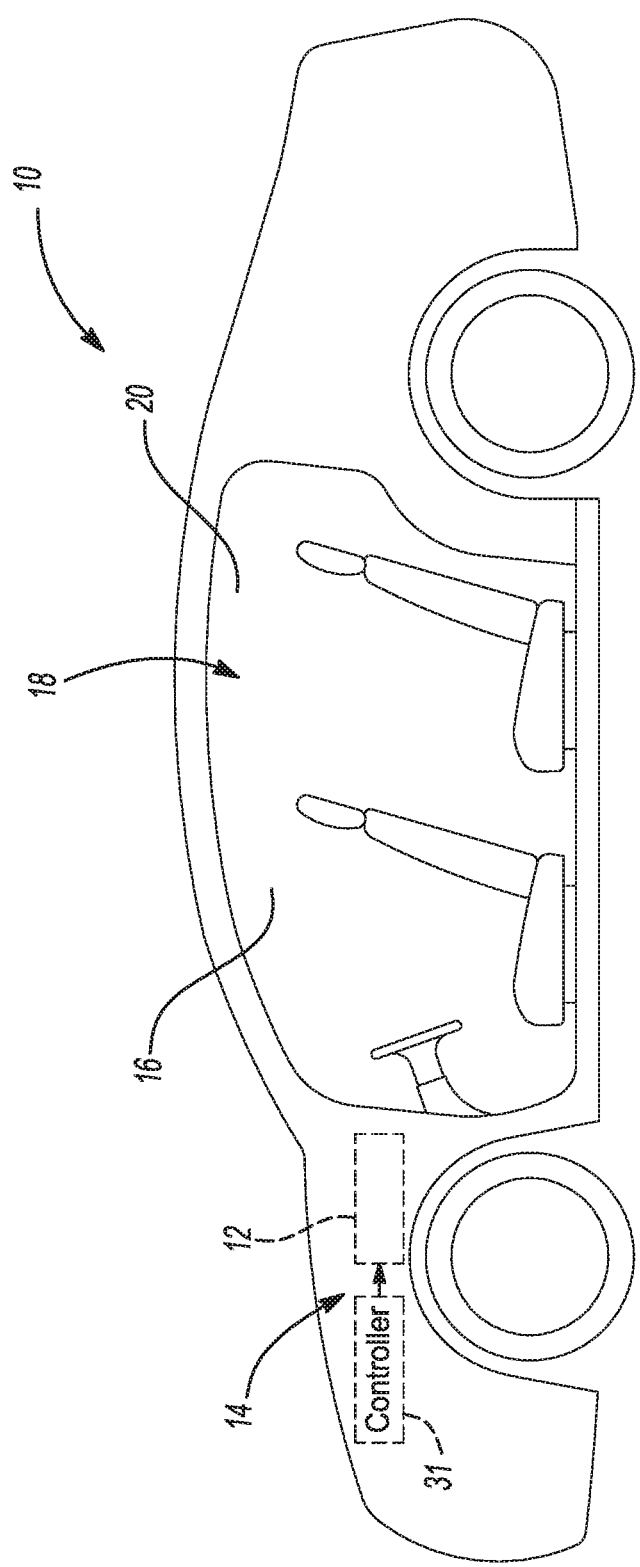
FIG. 1 is a representative vehicle including a heating, ventilation, and air conditioning (HVAC) unit in accordance with the present teachings.

Example embodiments will now be described more fully with reference to the accompanying drawings.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
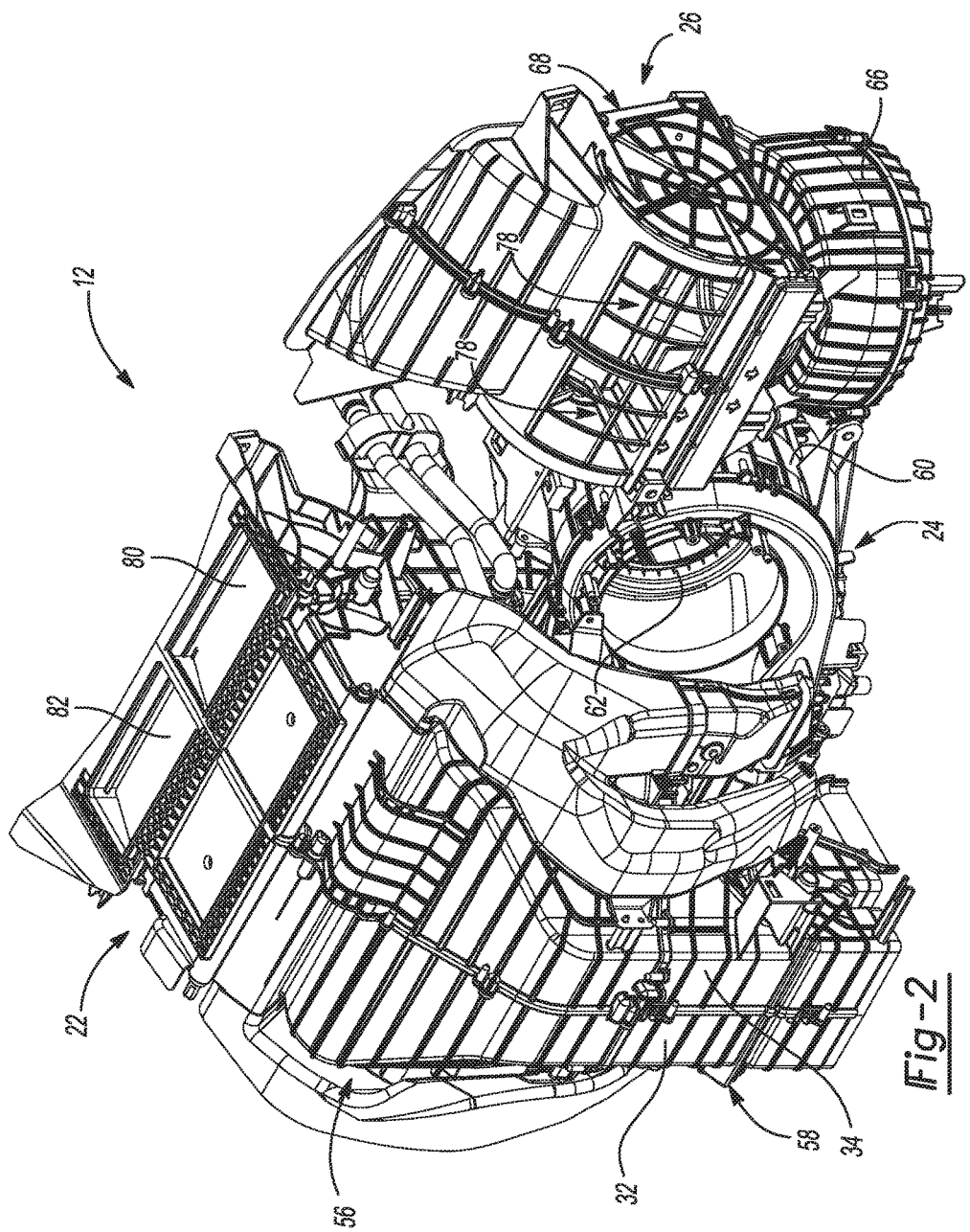
FIG. 2 is a perspective view of the HVAC unit of FIG. 1.

FIG. 1 illustrates a vehicle 10 having a heating, venting, and air cooling (HVAC) unit 12 disposed in a front portion 14 thereof. The HVAC unit 12 may provide airflow (heated and/or cooled) to a front region 16 of a vehicle cabin 18 via a front set of duct lines (not shown) and a rear region 20 of the vehicle cabin 18 via a rear set of duct lines (not shown). With additional reference to FIGS. 2-4, the HVAC unit 12 may include a casing 22, a rear blower unit 24, a front blower unit 26, a front damper assembly 28 and a rear damper assembly 30. A controller 31 (FIG. 1) may control the HVAC unit 12. That is, the controller 31 may determine HVAC inputs from a user through a user interface (not shown) and may control various components of the HVAC unit 12 such as the rear blower unit 24, the front blower unit 26, the front damper assembly 28, and the rear damper assembly 30.

The casing 22 may include a first shell 32, a second shell 34 and an evaporator housing 35. The first shell 32, the second shell 34, and the evaporator housing 35 may be formed of a molded plastic material, such as a thermoplastic for example, and can be joined together by any suitable method, including plastic welding, and/or clips for example. The first shell 32, the second shell 34 and the evaporator housing 35 may define a front airflow passageway 36, a rear airflow passageway 38, a plurality of front outlets 40 and a plurality of rear outlets 41. An evaporator 42 may be disposed within the evaporator housing 35 of the casing 22 such that a first section 42a is disposed in the front airflow passageway 36 and a second section 42b is disposed in the rear airflow passageway 38. The evaporator 42 may be any suitable type of heat exchanger such as a plate-fin heat exchanger or a shell-tube heat exchanger, for example, configured to remove heat from air flowing across or through the evaporator 42. Additionally, a heater core 44 may be disposed within the first and second shells 32, 34 of the casing 22 such that a first section 44a is disposed in the front airflow passageway 36 and a second section 44b is disposed in the rear airflow passageway 38. The heater core 44 can be any suitable type of heat exchanger, such as a plate-fin heat exchanger or shell-tube exchanger, for example, configured to add heat to the air flowing across or through the heater core 44.

The front airflow passageway 36 may include a front supply flue 46, a front cool flue 48, and a front heat flue 49. The front supply flue 46 may be located upstream of the evaporator 42 and may fluidly couple the front blower unit 26 and the evaporator 42. The front cool flue 48 is located downstream of the evaporator 42 and upstream of the heater core 44. That is, the front cool flue 48 is located between the evaporator 42 and the heater core 44 so as to fluidly couple the evaporator 42 and heater core 44. Airflow passing though the evaporator 42 from the supply flue 46 may be cooled as it enters into the front cool flue 48. The front heat flue 49 is located downstream of the heater core 44 and may fluidly couple the heater core 44 and the front outlets 40. Airflow passing through the heater core 44 from the front cool flue 48 may be heated as it enters into the front heat flue 49.

The rear airflow passageway 38 may include an inlet or rear supply flue 50, a rear cool flue 52, a rear heat flue 54, and a rear mix flue 55. The rear supply flue 50 may be located upstream of the evaporator 42 and may fluidly couple the rear blower unit 24 and the evaporator 42. The rear cool flue 52 is located downstream of the evaporator 42 and upstream of the heater core 44. That is, the rear cool flue 52 is located between the evaporator 42 and the heater core 44 so as to fluidly couple the evaporator 42 and heater core 44. Airflow passing though the evaporator 42 from the rear supply flue 50 may be cooled as it enters into the rear cool flue 52. The rear heat flue 54 is located downstream of the heater core 44 and may fluidly couple the heater core 44 and the rear mix flue 55. Airflow passing through the heater core 44 from the rear cool flue 52 may be heated as it enters into the rear heat flue 54. The rear mix flue 55 is located upstream of the rear outlets 41 and may fluidly couple the rear cool flue 52 and/or the rear heat flue 54 to the rear outlets 41.

Figure 4:
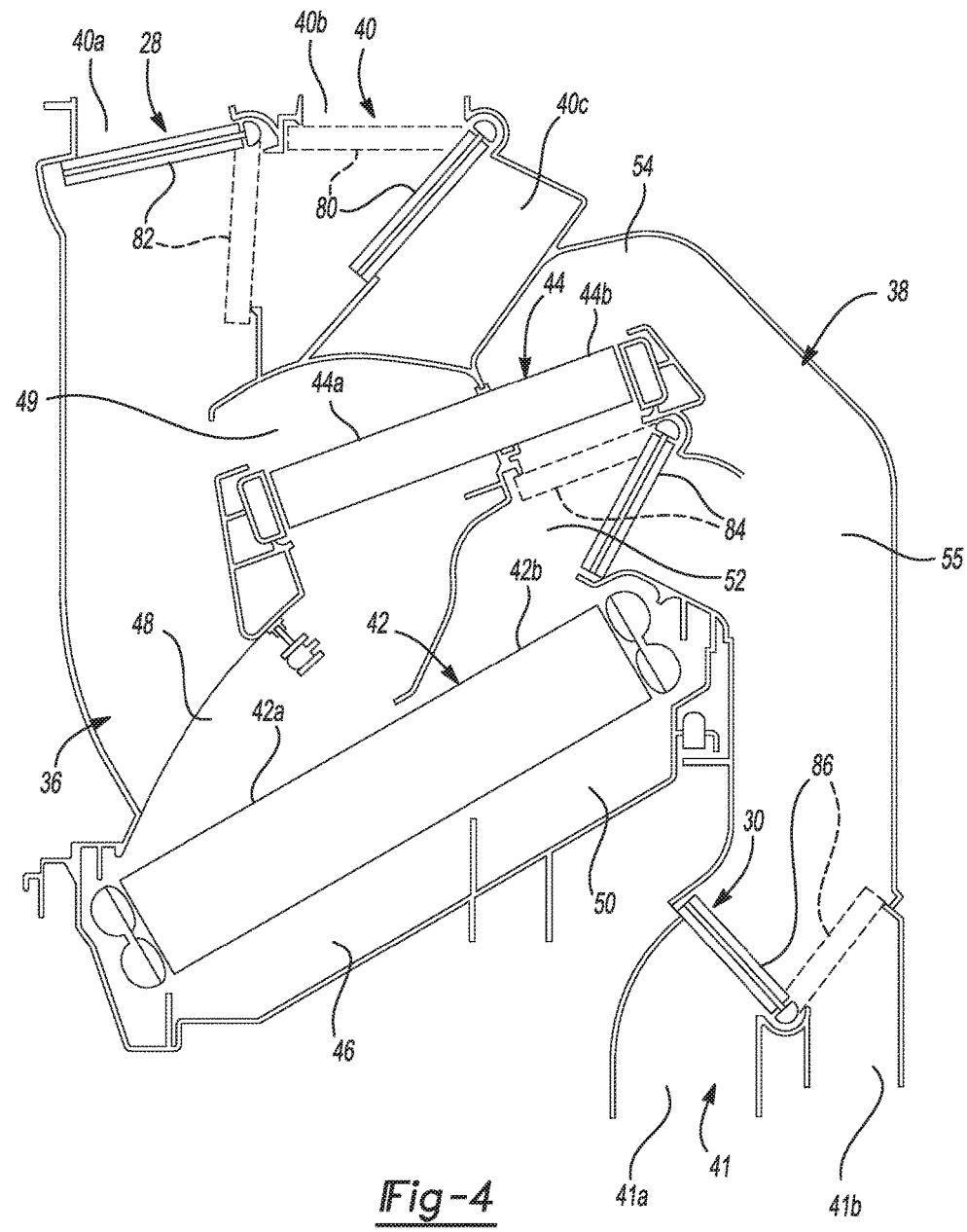
FIG. 4 is a cross-section view of the HVAC unit of FIG. 1.

The plurality of front outlets 40 may be in fluid communication with the front region 16 of the of the vehicle cabin 18. The plurality of front outlets 40 may also be fluidly coupled with the front heat flue 49 of the front airflow passageway 36 and may include a vent outlet 40a, a defrost outlet 40b, and a foot well outlet 40c (FIG. 4). The vent, defrost and foot well outlets 40a, 40b, 40c may be positioned adjacent to each other at an upper end 56 of the casing 22. Airflow passing through the front airflow passageway 36 may exit out of one or more of the vent, defrost, and foot well outlets 40a, 40b, 40c.

The plurality of rear outlets 41 may be in fluid communication with the rear region 20 of the of the vehicle cabin 18. The plurality of rear outlets 41 may also be fluidly coupled with the rear mix flue 55 of the rear airflow passageway 38 and may include a rear vent outlet 41a and a rear foot well outlet 41b (FIG. 4). The vent outlet 41a and foot well outlet 41b may be positioned adjacent to each other at the lower end 58 of the casing 22. Airflow passing through the rear airflow passageway 38 may exit out of one or both of the vent outlet 41a and foot well outlet 41b.

The rear blower unit 24 may be fluidly coupled to the rear supply flue 50 and configured to blow air to the rear supply flue 50. The rear blower unit 24 includes a blower housing 60, a rear blower fan 62 and a rear blower motor (not shown). The blower housing 60 defines a rear air inlet 64 that may be in fluid communication with the vehicle cabin 18 and the rear supply flue 50. The rear blower fan 62 is disposed within the blower housing 60. The rear blower motor (not shown) may be drivingly coupled to the rear blower fan 62 and operable in an ON-OFF mode. When the rear blower motor (not shown) is in the ON mode, the rear blower motor rotates the rear blower fan 62 to draw air through the rear air inlet 64 from the vehicle cabin 18 and into the rear supply flue 50. In some configurations, air can be drawn through the rear air inlet 64 from an exterior of the vehicle 10, in addition to, or instead of, the vehicle cabin 18.

Figure 3:
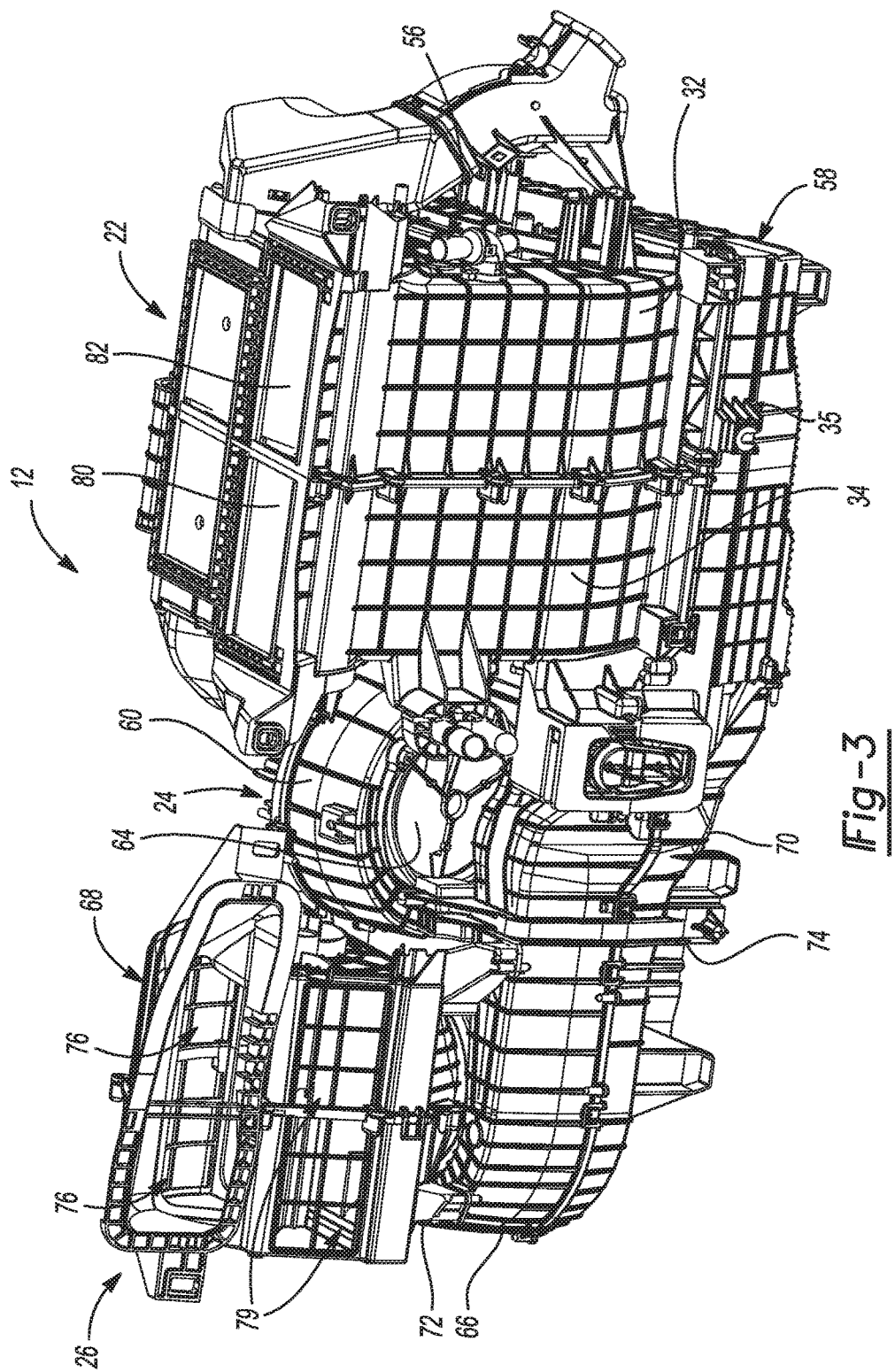
FIG. 3 is a back view of the HVAC unit of FIG. 1.

The front blower unit 26 is fluidly coupled with the front supply flue 46 and configured to blow air to the front supply flue 46. The front blower unit 26 includes a front blower housing 66, an inlet duct 68 and an outlet duct 70. The front blower housing 66 is coupled to the inlet duct 68 at one side 72 and coupled to the outlet duct 70 at another side 74 (FIG. 3). A front blower fan (not shown) is disposed within the front blower housing 66. A front blower motor (not shown) may be drivingly coupled to the front blower fan (not shown) and operable in an ON-OFF mode. When the front blower motor is in the ON mode, the front blower motor rotates the front blower fan to draw air through the inlet duct 68 and into the front supply flue 46 via the front blower housing 66 and the outlet duct 70.

The inlet duct 68 includes a first air inlet 76 fluidly coupled with the exterior of the vehicle 10 and/or the HVAC unit 12, a second air inlet 78 fluidly coupled with the vehicle cabin 18, and a third air inlet 79 fluidly coupled with the exterior of the vehicle 10 and/or HVAC unit 12. When the front blower motor (not shown) rotates the front blower fan (not shown), air may be drawn in from the exterior of the vehicle 10 and/or the HVAC unit 12 through the first and third air inlets 76, 79 and into the front supply flue 46. Alternatively or additionally, air may be drawn through the second air inlet 78 from the vehicle cabin 18 and into the front supply flue 46.

The front damper assembly 28 is disposed within the casing 22 proximate to the plurality of front outlets 40 (FIG. 4). The front damper assembly 28 includes a first damper 80 and a second damper 82. The first damper 80 is pivotally attached to the casing 22 and movable between a first position and a second position. When the first damper 80 is in the first position (shown in FIG. 4), airflow may exit the casing 22 through the defrost outlet 40b. When the first damper 80 is in the second position (shown in phantom lines in FIG. 4), airflow may exit the casing 22 through the foot well outlet 40c. It should be understood that the first damper 80 may be moved to an intermediate position (i.e., between the first and second positions) such that airflow may exit the casing 22 through both the defrost and foot well outlets 40b, 40c.

The second damper 82 is pivotally attached to the casing 22 and movable between a first position and a second position. When the second damper 82 is in the first position (FIG. 4), airflow may exit the casing 22 through one or both of the defrost and foot well outlets 40b, 40c (depending on the position of the first damper 80, as described above).

When the second damper 82 is in the second position (shown in phantom lines in FIG. 4), airflow may exit the casing 22 through the vent outlet 40a. In this position, airflow is prevented from exiting the casing 22 through either the defrost and foot well outlets 40b, 40c. It should be understood that the second damper 82 may be moved to an intermediate position (i.e., between the first and second positions) such that airflow may exit through the casing 22 through the vent outlet 40a and one or both of the defrost and foot well outlets 40b, 40c (depending on the position of the first damper 80, as described above).

The rear damper assembly 30 is disposed within the casing 22 proximate to the plurality of rear outlets 41. The rear damper assembly 30 includes a first damper 84 and a second damper 86. The first damper 84 is pivotally attached to the casing 22 and disposed between the evaporator 42 and the heater core 44. The first damper 84 is also movable between a first position and a second position. When the first damper 84 is in the first position (FIG. 4), airflow through the rear cool flue 52 is directed through the heater core 44 and the rear heat flue 54 to the rear mix flue 55. When the first damper 84 is in the second position (shown in phantom lines in FIG. 4), airflow through the rear cool flue 52 is directed directly to the rear mix flue 55. It should be understood that the first damper 84 may be moved to an intermediate position (i.e., between the first and second positions) such that airflow through the rear cool flue 52 may be directed to both the heater core 44 and directly to the rear mix flue 55. In this way, the temperature of the airflow through the rear mix flue 55 may be a blend or mixed of the airflow through the rear cool flue 52 and the rear heat flue 54.

The second damper 86 is pivotally attached to the casing 22 and movable between a first position and a second position. When the second damper 86 is in the first position (shown in FIG. 4), airflow through the rear mix flue 55 is directed to the foot well outlet 41b. When the second damper 86 is in the second position (shown in phantom lines in FIG. 4), airflow through the rear mix flue 55 is directed to the vent outlet 41a. It should be understood that the second damper 86 may be moved to an intermediate position (i.e., between the first and second positions) such that the airflow through the rear mix flue 55 may be directed to both the foot well outlet 41b and the vent outlet 41a.

Figure 5:
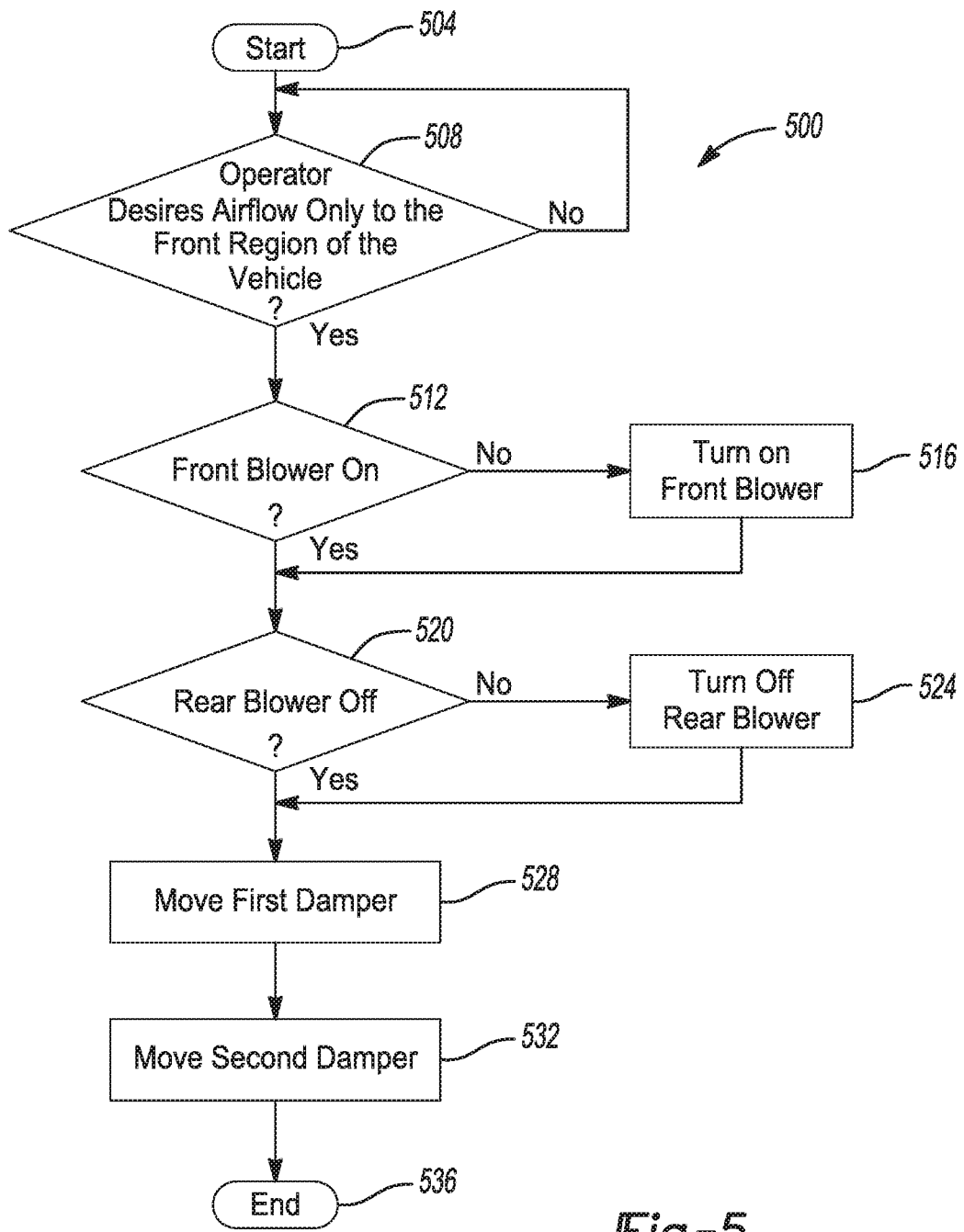
FIG. 5 is a flowchart of a control sequence of the HVAC unit.

With reference to FIG. 5, a flowchart 500 showing an example implementation of a control algorithm for reducing air leakage through the rear air inlet 64 fluidly coupled to the rear airflow passageway 36 of the HVAC unit 12 is shown. The control algorithm begins at 504 when the vehicle 10 is turned on by a vehicle operator (not shown) in the front region 16 of the vehicle cabin 18.

At 508, the control algorithm, using the controller 31, determines if the vehicle operator desires airflow (heated and/or cooled) only in the front region 16 of the vehicle cabin 18. This determination maybe based on the user inputs received through the user interface (not shown) of the vehicle 10. For example, the vehicle 10 may have occupants (not shown) in the rear region 20 of the vehicle cabin 18 who do not wish to have airflow to the rear region 20. In this case, the operator positioned in the front region 16 of the vehicle cabin 18 may desire to have airflow thereto, and therefore, may operate the user interface of the vehicle 10 so that airflow is allowed only in the front region of the vehicle cabin 18. If the vehicle operator desires airflow only in the front region 16 of the vehicle cabin 18, the control algorithm proceeds to 512; otherwise, the control algorithm remains at 508 until the operator desires airflow only to the front region 16 of the vehicle cabin 18.

At 512, the control algorithm, using the controller 31, determines if the front blower motor of the front blower unit 26 is in the ON mode. If the front blower motor of the front blower unit 26 is in the ON mode, the control algorithm proceeds to 520; otherwise, the control algorithm proceeds to 516 where the front blower is turned to the ON mode and then proceeds to 520.

At 520, the control algorithm, using the controller 31, determines if the rear blower motor of the rear blower unit 24 is in the OFF mode. If the rear blower motor of the rear blower unit 24 is in the OFF mode, the control algorithm proceeds to 528; otherwise, the control algorithm proceeds to 524 where the rear blower motor is turned to the OFF mode and then proceeds to 528.

In response to the rear blower motor turned to the OFF mode, airflow through the front airflow passageway 36 may leak across the evaporator 42 into the rear supply flue 50 and out the rear air inlet 64 into the front region 16 of the vehicle cabin 18. This air leakage may be discomforting to the operator in the front region 16 of the vehicle 10.

At 528, the control algorithm moves the first damper 84 of the rear damper assembly 30 from the first position toward, or to, the second position. In this way, the pressure drop of the rear airflow passageway 38 is reduced, which, in turn, reduces the air leakage to the rear supply flue 50 and out the rear air inlet 64 into the front region 16 of the vehicle cabin 18. Instead, the air leakage is directed to the rear mix flue 55 and out the rear outlets 41. In some configurations, the first damper 84 of the rear damper assembly 30 may be moved to the intermediate position when the vehicle cabin 18 is warm so that the air leakage may be directed partially through the heater core 44. In this way, the temperature of any air leakage out of the plurality of rear outlets 41 is substantially similar to the temperature of the vehicle cabin 18, and therefore, unnoticeable to the occupants in the rear region 20 of the vehicle cabin 18. After moving the first damper 84 of the rear damper assembly 30 from the first position toward, or to, the second position, the control algorithm then proceeds to 532.

At 532, the control algorithm moves the second damper 82 of the rear damper assembly 30 to, or near, the intermediate position to further distribute any air leakage from the rear mix flue 55 between the vent outlet 41b and the vent outlet 41b so that the air leakage is unnoticeable by the occupants in the rear region 20. The controller 31 then proceeds to 536 and ends.

What is claimed is:

1. A heating, ventilation, and air conditioning (HVAC) unit comprising:
   a casing defining a front airflow passageway, a rear airflow passageway and first and second outlets, the rear airflow passageway having an inlet, the first and second outlets fluidly coupled with the rear airflow passageway;
   an evaporator disposed within the casing such that a first section of the evaporator is disposed in the front airflow passageway and a second section of the evaporator is disposed in the rear airflow passageway;
   a heater core disposed within the casing such that a first section of the heater core is disposed in the front airflow passageway and a second section of the heater core is disposed in the rear airflow passageway;
   a first damper disposed within the casing between the evaporator and the heater core, the first damper movable between a first position in which airflow is directed to the second section of the heater core and a second position in which airflow is directed away from the second section of the heater core;

a first blower unit configured to blow air through the front airflow passageway;

a second blower unit configured to blow air through the rear airflow passageway; and a controller operatively connected to the first damper, the first blower unit and the second blower unit, wherein the controller moves the first damper from the first position toward the second position when the first blower unit is in an ON mode and the second blower unit is in an OFF mode, wherein airflow across the evaporator from the front airflow passageway to the rear airflow passageway is directed to the first and second outlets when the first damper is moved from the first position toward the second position.

2. The HVAC unit of claim 1, wherein the first damper controls airflow through the rear airflow passageway.

3. The HVAC unit of claim 2, wherein the first damper reduces the airflow from the front airflow passageway from flowing across the evaporator to the inlet of the rear airflow passageway.

4. The HVAC unit of claim 3, further comprising a second damper disposed within the casing downstream of the heater core, and wherein the second damper is movable between a first position and a second position.

5. The HVAC unit of claim 4, wherein the second damper is moved to an intermediate position to distribute the airflow from the front airflow passageway to the rear airflow passageway out the first and second outlets.

6. A heating, ventilation, and air conditioning (HVAC) unit comprising:

a casing defining a front airflow passageway, a rear airflow passageway and first and second outlets, the rear airflow passageway having an inlet, the first and second outlets fluidly coupled with the rear airflow passageway;

an evaporator disposed within the casing such that a first section of the evaporator is disposed in the front airflow passageway and a second section of the evaporator is disposed in the rear airflow passageway;

a heater core disposed within the casing such that a first section of the heater core is disposed in the front airflow passageway and a second section of the heater core is disposed in the rear airflow passageway;

a first damper disposed within the casing between the evaporator and the heater core, the first damper movable between a first position in which airflow is directed to the second section of the heater core and a second position in which airflow is directed away from the second section of the heater core;

a first blower unit configured to blow air through the front airflow passageway;

a second blower unit configured to blow air through the rear airflow passageway; and a controller operatively connected to the first damper, the first blower unit and the second blower unit, wherein the controller moves the first damper from the first position toward the second position when the first blower unit is in an ON mode and the second blower unit is in an OFF mode, wherein moving the first damper from the first position toward the second position reduces airflow across the evaporator from the front airflow passageway from flowing across the evaporator to the inlet of the rear airflow passageway.

7. The HVAC unit of claim 6, wherein the first damper controls airflow through the rear airflow passageway.

8. The HVAC unit of claim 7, wherein the airflow from the front airflow passageway to the rear airflow passageway is directed to the first and second outlets when the first damper is moved from the first position toward the second position.

9. The HVAC unit of claim 8, further comprising a second damper disposed within the casing downstream of the heater core, and wherein the second damper is movable between a first position and a second position.

10. The HVAC unit of claim 9, wherein the second damper is moved to an intermediate position to distribute the airflow from the front airflow passageway to the rear airflow passageway out of the first and second outlets.

* * * * *